(12) United States Patent
Fujii et al.

(10) Patent No.: US 6,599,985 B2
(45) Date of Patent: Jul. 29, 2003

(54) POLYPROPYLENE MATERIALS WITH HIGH MELT FLOW RATE AND GOOD MOLDING CHARACTERISTICS AND METHODS OF MAKING

(75) Inventors: Masaki Fujii, Sewickley, PA (US); Sehyun Kim, Murrysville, PA (US)

(73) Assignee: Sunoco Inc. (R&M), Philadelphia, PA (US)

( * ) Notice: Subject to any disclaimer, the term of this patent is extended or adjusted under 35 U.S.C. 154(b) by 0 days.

(21) Appl. No.: 09/974,130

(22) Filed: Oct. 8, 2001

(65) Prior Publication Data

US 2002/0065371 A1 May 30, 2002

Related U.S. Application Data

(60) Provisional application No. 60/239,353, filed on Oct. 11, 2000.

(51) Int. Cl.$^7$ ................................................. C08L 23/04
(52) U.S. Cl. ........................ 525/240; 525/191; 525/192
(58) Field of Search ................................ 525/191, 192, 525/240

(56) References Cited

U.S. PATENT DOCUMENTS 3,121,070 A    2/1964  Coover et al.
4,652,326 A    3/1987  Spielau et al.
5,066,723 A   11/1991  Randall, Jr. et al.
5,459,201 A   10/1995  Shroff et al.
5,514,745 A    5/1996  Yoshino
5,536,773 A    7/1996  Yamada et al.
5,789,046 A    8/1998  Mueller
5,804,304 A    9/1998  Williams et al.
5,820,981 A   10/1998  Williams et al.
5,837,177 A   11/1998  DiNardo et al.
5,855,985 A *  1/1999  O'Donnell .................. 105/18
6,057,407 A    5/2000  Lin et al.
6,268,064 B1   7/2001  Kim

FOREIGN PATENT DOCUMENTS

EP    0 822 226 A2   2/1998
WO    WO 99/07785    2/1999
WO    WO 00/34385    6/2000

* cited by examiner

*Primary Examiner*—Nathan M. Nutter
*Assistant Examiner*—Theo Tran
(74) *Attorney, Agent, or Firm*—Robert A. Koons, Jr.; Karen C. Richardson; Buchanan Ingersoll, PC

(57) ABSTRACT

The present invention provides polypropylene made by dispersing at least one, cracking-resistant polymer therein for controlled rheology treatment to yield a polypropylene polymer with a high melt flow rate and good molding characteristics.

11 Claims, No Drawings ically produced polypropylene is to degrade low melt flow rate polypropylene using controlled rheology. Controlled rheology treatments are often employed as alternative techniques for producing high melt flow rate ("MFR") polypropylene because these treatments do not depend on hydrogen solu-
POLYPROPYLENE MATERIALS WITH HIGH MELT FLOW RATE AND GOOD MOLDING CHARACTERISTICS AND METHODS OF MAKING This application claims priority from U.S. Provisional Application No. 60/239,353, filed on Oct. 11, 2000.

FIELD OF THE INVENTION

The present invention relates to the production of propylene polymer. In particular, the present invention relates a controlled rheology propylene polymer which has a high melt flow rate and good molding characteristics, as well as techniques for producing said controlled rheology propylene polymer.

BACKGROUND

High melt flow rate polypropylene can be produced directly in a polymerization reactor, but its production is often limited by the solubility of hydrogen in the reaction. Hydrogen is the most effective chain transfer agent for propylene polymerization reactions, whether the reaction takes place in solution or in the bulk monomer.

Another method for producing high melt flow rate polypropylene is to degrade low melt flow rate polypropylene using controlled rheology. Controlled rheology treatments are often employed as alternative techniques for producing high melt flow rate ("MFR") polypropylene because these treatments do not depend on hydrogen solubility. Instead, controlled rheology treatments are typically carried out using organic peroxides in a polymer extruder. See, e.g., Castagna, et al., U.S. Pat. No. 3,940,379, and Morman, et al, U.S. Pat. No. 4,951,589. Controlled rheology treatments can also be used to increase production efficiency by converting the low melt flow rate polymers into high melt flow rate polymers without changing plant operating reactor conditions. Thus, many manufacturers prefer controlled rheology treatments to produce high melt flow rate polymers.

However, molded parts made from typical controlled rheology treated polypropylene tend to have inferior appearance and surface characteristics, and are often marred by flow marks such as tiger marks. Controlled rheology polypropylene has a narrow molecular weight distribution which results from the selective loss of longer molecular chains due to the action of the organic peroxides. This narrow molecular weight distribution does not permit good surface molding of the molded article due to the irregular flow of the molten polymer in the mold. This irregular flow will lead to the above-mentioned surface flaws. Therefore, the use of controlled rheology polypropylene in injection molding has been limited to applications that do not require good surface characteristics.

The addition of a high molecular weight component to the controlled rheology materials will improve the irregular flow in the mold. It is believed that this improvement occurs because of the broadened molecular weight distribution, however, the addition of the high molecular weight component sacrifices in turn the high MFR properties gained in controlled rheology treatment. Thus, there is a need in the art for a controlled rheology propylene polymers which have a high MFR and good surface characteristics when in injection molding.

SUMMARY

The present invention relates to controlled rheology propylene polymers which possesses a high MFR and good surface characteristics in molding applications. The controlled rheology ("CR") propylene polymers include in their composition a propylene polymer and a cracking-resistant polymer, one which is capable of resisting the degradation by cracking agents.

In one embodiment, the invention relates to a CR propylene polymer composition which includes a propylene polymer and about 0.01% by weight to about 10% by weight of at least one cracking resistant polymer.

In one embodiment, the invention relates a method of making CR propylene polymers by polymerizing propylene in the presence of the cracking-resistant polymer to produce a cracking-resistant propylene polymer, wherein the at least one cracking-resistant polymer comprises 0.01% by weight to about 10% by weight of the CR propylene polymer. The rheology of the cracking-resistant propylene polymer can then be modified with at least one cracking agent. In one embodiment, the at least one cracking resistant polymer comprises from about 0.5% to about 1.0% by weight of the CR propylene polymer.

In one embodiment, the cracking agent is a free radical moiety or initiator. The cracking agent is typically selected from the group which includes peroxides, irradiation treatments, and electron beam treatments. Peroxides include both organic and inorganic peroxides, and irradiation includes using gamma or similar high energy irradiation. Typical examples of peroxides of the present invention may be selected from 2,5-dimethyl-2,5-di(t-butylperoxy)hexane; 2,5-dimethyl-2,5-di(t-butylperoxy)hexyne-3; 3,6,6,9,9-pentamethyl-3-(ethyl acetate)-1,2,4,5-tetraoxy cyclononane; t-butyl hydroperoxide; hydrogen peroxide; dicumyl peroxide; t-butyl peroxy isopropyl carbonate; di-t-butyl peroxide; p-chlorobenzoyl peroxide; dibenzoyl diperoxide; t-butyl cumyl peroxide; t-butyl hydroxyethyl peroxide; di-t-amyl peroxide; and 2,5-dimethylhexene-2,5-diperisononanoate.

In one embodiment, the invention relates to a method of making CR propylene polymers, the method comprising, incorporating at least one cracking-resistant polymer into a propylene polymer, wherein the at least one cracking-resistant polymer comprises 0.01 to about 10% (by weight) of the propylene polymer, and modifying the rheology of the propylene with at least one cracking agent.

DETAILED DESCRIPTION

As used herein, the terms "propylene polymers" and "polypropylene" are used interchangeably, and generally include, but are not limited to, propylene homopolymers, copolymers, such as, for example, block, graft, impact, random and alternating copolymers, terpolymers, and the like, as well as blends and modifications thereof. Co-monomers typically included in the propylene include 1-butene, 1-hexene, ethylene, and other alpha-olefins. Furthermore, unless otherwise specifically limited, the terms "polypropylene" and "propylene polymer" includes all of the geometrical configurations of the material. These configurations include, but are not limited to, isotactic, syndiotactic, and atactic symmetries.

As used herein, the term "cracking-resistant polymers" includes polymers which, if treated as a neat polymer with peroxides or other cracking agents, increase or substantially maintain their intrinsic viscosity. Polymers with tertiary carbon atoms are most susceptible to degradation by free-radicals such as organic peroxides, and by gamma radiation or electron beam. Cracking agents withdraw hydrogen atoms from the polymer, causing it to break apart into shorter segments. Polymers without tertiary carbon atoms are less susceptible to such degradation. Propylene polymers, which have tertiary carbon atoms, will degrade by this mechanism, while ethylene polymers, which do not have tertiary carbon atoms, will not substantially degrade or reduce in average molecular weight upon exposure to a cracking agent.

In the present invention, the propylene polymer which is treated for controlled rheology, contains up to about 10% by weight of at least one cracking-resistant polymer. The cracking-resistant polymer has a high molecular weight (above about 1,000,000) and is relatively inert to chain scission by cracking agents. Although the MFR is effectively raised by controlled rheology, the cracking-resistant polymer stays intact to retain the desired smooth flowability of the molten polypropylene in the mold.

Cracking-resistant polymers such as polyethylene, polytetrafluoroethylene (PTFE) are preferred in the present invention as are other polymers which are resistant to peroxide or radiation-induced degradation, such as ethylene copolymers with alpha-olefins, preferably polypropylene, with an alpha-olefin content of less than 50% by weight, more preferably less than 30% by weight and most preferably less than 10%. The cracking-resistant polymer preferably is present in the propylene polymer in more than 0.01% and less than or equal to 10% by weight, more preferably in more than 0.05% and less than or equal to 5% by weight and most preferably in more than 0.1% and less than or equal to 2%.

Cracking-resistant polymers such as high, or ultra high, molecular weight polyethylene or polytetrafluoroethylene should preferably be incorporated into the polypropylene matrix at a very high degree of dispersion prior to the controlled rheology treatment. Techniques useful for dispersing the cracking resistant polymer include melt blending (mechanically mixing or extruding the polymers while in a liquid state), and in-reactor blending. In Example 1, the cracking resistant polymer, ultra-high molecular weight polyethylene, was prepared in the first stage polymerization followed by the second stage polymerization of propylene. This is a typical example of in-reactor blending using multi-stage polymerization. Polymerization reactions in this invention were carried out, unless otherwise noted, using the Ziegler-Natta catalyst system and typical reactor conditions for this system, i.e. pressure, temperature, solvent and the like. See, e.g. Sivak, et al. U.S. Pat. No. 5,294,679.

For example, but without limitation, high (above 1,000,000 or even above about 5,000,000) or ultra high (above 5,000,000 or even above about 10,000,000) molecular weight ethylene polymers can preferably be dispersed into the polypropylene matrix by polymerizing ethylene to a very high molecular weight before propylene is polymerized. U.S. Pat. No. 4,271,279 details methods of making such high molecular weight polyethylene and its contents are incorporated herein by reference.

Polytetrafluoroethylene (MW above 1,000,000 or even above about 5,000,000) can be dispersed by mechanically blending with propylene polymers in the same extruder which is used for a simultaneous or subsequent controlled rheology treatment. Polytetrafluoroethylene preferably can be dispersed simultaneously with the controlled rheology treatment in the extruder. A surface-modified polytetrafluoroethylene particularly preferred in the present invention is an acrylic-modified polytetrafluoroethylene commercially available as Metablen® A 3000, from Japan's Mitsubishi Rayon Company, Ltd.

Cracking agents useful in the present invention include those mentioned above which are conventionally used in the controlled rheology treatment. These cracking agents include organic peroxides, inorganic peroxides, high energy radiation or electron beam. A preferred peroxide is 2,5-dimethyl-2,5-di(t-butylperoxy)hexane, which is commercially available as Trigonox® 101 from AKZO NOBEL. Other examples of peroxides useful in the present invention include but are not limited to: 2,5-dimethyl-2,5-di(t-butylperoxy)hexyne-3, commercially available as Lupersol 130 from Pennwalt Corp.; 3,6,6,9,9-pentamethyl-3-(ethyl acetate)1,2,4,5-tetraoxy cyclononane, commercially available as USP-138 from Witco Chemical Corp.; t-butyl hydroperoxide; hydrogen peroxide; dicumyl peroxide; t-butyl peroxy isopropyl carbonate; di-t-butyl peroxide; p-chlorobenzoyl peroxide; dibenzoyl diperoxide; t-butyl cumyl peroxide; t-butyl hydroxyethyl peroxide, di-t-amyl peroxide; and 2,5-dimethylhexene-2,5-diperisononanoate.

The term "cracking ratio" as used herein is a numerical value calculated from the formula:

Equation 1:

$$\text{Cracking ratio} = \frac{\text{MFR after cracking}}{\text{MFR before cracking}}$$

The cracking ratio of the present invention is preferably about 1.1–100, more preferably 5–30 and most preferably 10–15. The MFR of the starting propylene material (MFR before cracking) is preferably about 0.1 to about 15 g/10 min., as calculated per ASTM D1238.

The polymerization operating parameters used in the Examples below can be found in the detailed explanation of U.S. Pat. No. 5,294,679. Since the '679 patent describes propylene copolymerization, the procedure may be modified for propylene homopolymerization. CR treatment is carried out at temperature selected between 175° C. and 235° C., more practically between 190° C. and 220° C. Starting MFR is typically from 0.1 to 15. Peroxides are used typically in the amount between 0.1% and 1% based on the total polymer components. The actual amount is selected according to the target cracking ratio defined by equation 1. If the cracking resistant polymer is polyethylene, the typical amount is 0.3% and 1.0%. If the crack-resistant polymer is PTFE, the typical amount is between about 2% and 8%.

The present invention will now be described for the purposes of illustration and not limitation by the following examples. The results of these examples are summarized in Table 1.

EXAMPLE 1

Polypropylene containing about 1% polyethylene was prepared according to the general method disclosed in the Example 1 of Japanese Laid Open Patent Application 2000-07124. Briefly, an olefin (co)polymer composition comprising 0.01–5 parts by weight of high molecular weight polyethylene and 100 parts by weight. of polypropylene with ordinary intrinsic viscosity and a nucleating agent was prepared as disclosed therein. The polyethylene portion of this composition is prepared by pre-activation of the propylene polymerization catalyst system, which includes a transition metal compound, organo-metallic compound and electron donor, and propylene is polymerized thereafter. The polymer thus obtained had a melt flow rate of 5. The molecular weight of the polyethylene was too high to be successfully measured by gel permeation chromatography. This polypropylene treated with Trigonox® 101 to adjust the melt flow rate to 55, after which it was molded into a step stool using a 400-ton Van Dorn injection-molding machine (melt temperature 225° C., mold temperature 42° C.). The surface of the molded article was smooth and no flow marks were observed.

Comparative Example 2

Polypropylene with a melt flow rate of 8.7 was prepared in a similar manner to example 1, except that no cracking-resistant polymer was incorporated. The polypropylene was treated with Trigonox® 101 in an extruder to adjust the melt flow rate to 55, and then injection molded as in Example 1. The molded article showed flow marks that were alternating glossy and dull stripes.

Comparative Example 3

Polypropylene with a melt flow rate of 55 was prepared in the reactor, and no cracking-resistant polymer was incorporated. The polypropylene powder was extruded under the same conditions as in Example 1, except that no controlled rheology treatment was performed. The resulting polypropylene was injection molded as in Example 1. The molded article showed no flow marks. The method used in this Example produced a product comparable to that of Example 1.

EXAMPLE 4

To demonstrate the use of polytetrafluoroethylene as a cracking-resistant polymer, polypropylene with a melt flow rate of 8.7, as prepared in comparative Example 2, was blended with 5 wt % Metablen® A 3000 and was treated with Trigonox® 101 in the extruder to adjust the melt flow rate to 55. The resulting polypropylene was injection molded as in Example 1. The molded article showed no flow marks on the surface.

TABLE 1

| Example | Initial MFR | Final MFR | Cracking-Resistant Polymer | Cracking Agent | Flaws or marks |
| --- | --- | --- | --- | --- | --- |
| Example 1 | 5 | 55 | Polyethylene | Trigonox ® 101 | none |
| Comp. Ex. 2 | 8.7 | 64 | None | Trigonox ® 101 | alternating glossy and dull stripes |
| Comp. Ex. 3 | 55 | 55 | None | none | none |
| Example 4 | 8.7 | 60 | Metablen ® A 3000 | Trigonox ® 101 | none |

Table 1 summarizes the MFRs, compositions, and appearances obtained in Examples 1 to 4. The Cracking ratios of Examples 1 and 4 were 11 and 6.9 respectively, and produced molded articles of comparable quality to that produced from the untreated, high MFR propylene polymer of Comparative Example 3. In contrast, the CR treated, high MFR polymer of Comparative Example 2 (cracking ratio of 7.3), which lacked the cracking resistant polymer, had an appearance marred by flow marks.

The foregoing recitation of the invention is offered for the purposes of illustration only, and not for purposes of limitation. It will be readily apparent to those skilled in the art that the embodiments described herein may be modified or revised in various ways without departing from the spirit and scope of the invention. Instead, the scope of the invention is to be measured by the appended claims.

What is claimed:

1. A method of improving the molding characteristics of a high melt flow controlled rheology propylene copolymer, said method comprising: incorporating at least one cracking-resistant polymer into a propylene polymer wherein said at least one cracking-resistant polymer is selected from the group consisting of ultra-high molecular weight polyethylene and polytetrafluoroethylene and wherein said at least one cracking-resistant polymer comprises from about 0.01% by weight to about 10% by weight of said propylene polymer; and modifying the rheology of said copolymer with at least one cracking agent.

2. The method of claim 1, wherein the step of incorporating at least one cracking-resistant polymer is performed by a technique selected from the group consisting essentially of melt blending, in-reactor blending, and mechanical blending with the propylene polymer.

3. The method of claim 1, wherein said at least one cracking-resistant polymer comprises from about 0.01% by weight to about 5% by weight of said propylene polymer.

4. The method of claim 1, wherein said at least one cracking-resistant polymer comprises from about 0.01% by weight to about 2% by weight of said propylene polymer.

5. The method of claim 1, wherein said propylene polymer is polymer selected from the group consisting essentially of isotactic propylene polymer, syndiotactic propylene polymer, propylene homopolymer, impact copolymer and random copolymer.

6. The method of claim 1, wherein said propylene polymer includes at least one of ethylene, 1-butene and 1-hexene.

7. The method of claim 1, wherein said step of modifying includes a cracking ratio of 1.1–100.

8. The method of claim 1, wherein said step of modifying includes a cracking ratio of 5–30.

9. The method of claim 1, wherein said step of modifying includes a cracking ratio of 10–15.

10. The method of claim 1, wherein said at least one cracking agent comprises a peroxide selected from the group consisting essentially of: 2,5-dimethyl-2,5-di-(t-butylperoxy)hexane, 2,5-dimethyl-2,5-di-(t-butylperoxy) hexyne-3, t-butyl hydroperoxide; 3,6,6,9,9-pentamethyl-3-(ethyl acetate)-1,2,4,5-tetraoxy cyclononane, hydrogen peroxide, dicumyl peroxide, t-butyl peroxy isopropyl carbonate, di-t-butyl peroxide, p-chlorobenzoyl peroxide, dibenzoyl diperoxide; t-butyl cumyl peroxide, t-butyl hydroxyethyl peroxide, di-t-amyl peroxide and 2,5 dimethylhexene-2,5-diperisononanoate.

11. The method of claim 1, wherein said at least one cracking agent comprises high energy radiation selected from the group consisting of: a gamma ray and an electron beam.

* * * * *